(12) United States Patent
Rinta-Aho et al.

(10) Patent No.: US 8,588,751 B2
(45) Date of Patent: Nov. 19, 2013

(54) EXTENDING WLAN SIGNALLING

(75) Inventors: Teemu Rinta-Aho, Espoo (FI); Tero Kauppinen, Espoo (FI)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1107 days.

(21) Appl. No.: 12/093,273

(22) PCT Filed: Nov. 16, 2005

(86) PCT No.: PCT/EP2005/012293
§ 371 (c)(1),
(2), (4) Date: May 9, 2008

(87) PCT Pub. No.: WO2007/057035
PCT Pub. Date: May 24, 2007

(65) Prior Publication Data
US 2008/0261574 A1    Oct. 23, 2008

(51) Int. Cl.
*H04M 3/42*    (2006.01)
(52) U.S. Cl.
USPC ............... 455/414.1; 455/414.3; 370/331
(58) Field of Classification Search
USPC ............ 455/435.2, 436–437, 414.1–414.3; 370/338, 331
See application file for complete search history.

(56) References Cited

U.S. PATENT DOCUMENTS

2002/0028669 A1   3/2002   Rhawi
2002/0102978 A1*  8/2002   Yahagi ................. 455/437
2002/0132614 A1*  9/2002   Vanluijt et al. ........ 455/414
2004/0063426 A1*  4/2004   Hunkeler ............... 455/426.1
2004/0192264 A1   9/2004   Liu et al.

FOREIGN PATENT DOCUMENTS

WO    WO03063525 A    7/2003

OTHER PUBLICATIONS

Hecker A, et al.: "A new EAP-based signal protocol for IEEE 802.11 wireless LANS." Vehicular Technology Conference, 2004 VTC2004-Fall. 2004 IEEE 60$^{th}$ Los Angeles CA, USA Sep. 26-20, 2004 (Sep. 6, 2004) pp. 3214-3218.
"Part 11: Wireless LAN Medium Access Control (MAC) and Physical Layer (PHY) Specifications". ANSI/IEEE Std 802.11, 1999 Edition (R2003).
Narten, et al: "Neighbor Discovery for IP Version 6 (IPv6)". Network Working Group. Request for Comments: 2461. Dec. 1998.
"Initial Proposal to IEEE 802.21 from Samsung". IEEE 802.21 Media Independent Handover Services. Jan. 10, 2005.

* cited by examiner

*Primary Examiner* — Jinsong Hu
*Assistant Examiner* — Nathan Taylor

(57) ABSTRACT

The present invention relates to a method, device, instruction set, and signal for communicating the availability of additional information in access points relevant for determining in a mobile station which access point to connect to. An information tag is inserted into a beacon signal alerting of the additional information available; mobile stations not implemented with the present invention may operate as if the information tag was not present and thus ensuring compatibility between systems.

13 Claims, 4 Drawing Sheets

EXTENDING WLAN SIGNALLING

TECHNICAL FIELD

The present invention relates to wireless signalling and in particular to a method of extending information exchange in wireless communication.

BACKGROUND OF THE INVENTION

Currently in Wireless LAN (WLAN) setups mobile stations select the access point based on radio link parameters and the network identity broadcasted in special signalling messages, so called beacons. This information is, however, in some cases inadequate to base the selection on of which access point to connect to. The user of the mobile station may have other preferences, such as price, while the applications need to know the available QoS (Quality of Service) etc.

WLAN access points broadcast beacons on a regular basis, normally every 100 milliseconds. Extending the beacons with extra information increases their size and thus wastes the available bandwidth on the channel. Including all desired information into the beacons would therefore not be desirable.

SUMMARY OF THE INVENTION

It is therefore an object of the present invention to provide a method, device, and signal for interchanging information between a mobile station and an access point.

Wireless LAN signalling can be used to automatically obtain network characteristic parameters prior to when the node establishes a connection to the network. Network characteristic parameters in this context refer to information such as price, network utilization and network access provider information that may affect the user's selection of a preferable network.

The present invention may in a first aspect be realized as a method of communicating information to a mobile station in a wireless network, comprising the steps of:
  broadcasting a signal with an information tag alerting mobile stations that additional information is available from an access point to listening mobile stations within communication range;
  receiving the beacon at a mobile station arranged to interpret the information tag;
  sending an information request from the mobile station to the access point; and
  sending the additional information from the access point to the mobile station.

The additional information may be at least one of access point ownership, network load status, cryptographic network identities, roaming related information, available services, routing information, geographical location information, commercial information and any other relevant information.

The additional information may be cached in the access point or may be collected from network connected to the access point.

The signal may be a beacon message prepared in the access point.

Another aspect of the present invention, an access point in a wireless network is provided, comprising
  a wireless communication interface for communicating with mobile stations;
  a communication interface for communicating with a network;
wherein the access point is arranged to prepare a beacon with an information tag alerting the mobile stations that additional information is available.

The additional information may be at least one of access point ownership, network load status, cryptographic network identities, roaming related information, available services, routing information, geographical location information, and commercial information.

Yet another aspect of the present invention, a mobile station in a wireless network is provided, comprising a wireless-communication interface for communicating with at least one access point, wherein the mobile station is arranged to interpret an information tag present in a beacon signal sent from the access point; the information tag alerting of additional information available in the access point, arranged to send a request for the additional information and further arranged to decide which access point to connect to based on the additional information.

Still another aspect of the present invention, a beacon signal in a wireless network is provided, comprising a type-length-value (TLV) tagged parameter list comprising at least information about transmitter identity and an information tag alerting of additional information available at the transmitter, wherein the flag comprise two bytes of information; a tag number and a tag length.

The present invention may also be realized as an instruction set in a mobile communication device for deciding a gateway to connect to, comprising;
  an instruction set for receiving a beacon including an information tag alerting of additional information available in a gateway;
  an instruction set for sending a request for the additional information to the gateway;
  an instruction set for receiving the additional information;
  an instructions set for using the additional information in the decision of which gateway to connect to.

DEFINITIONS

RA—Router advertisement
WLAN—Wireless Local Area Network
QoS—Quality of Service

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
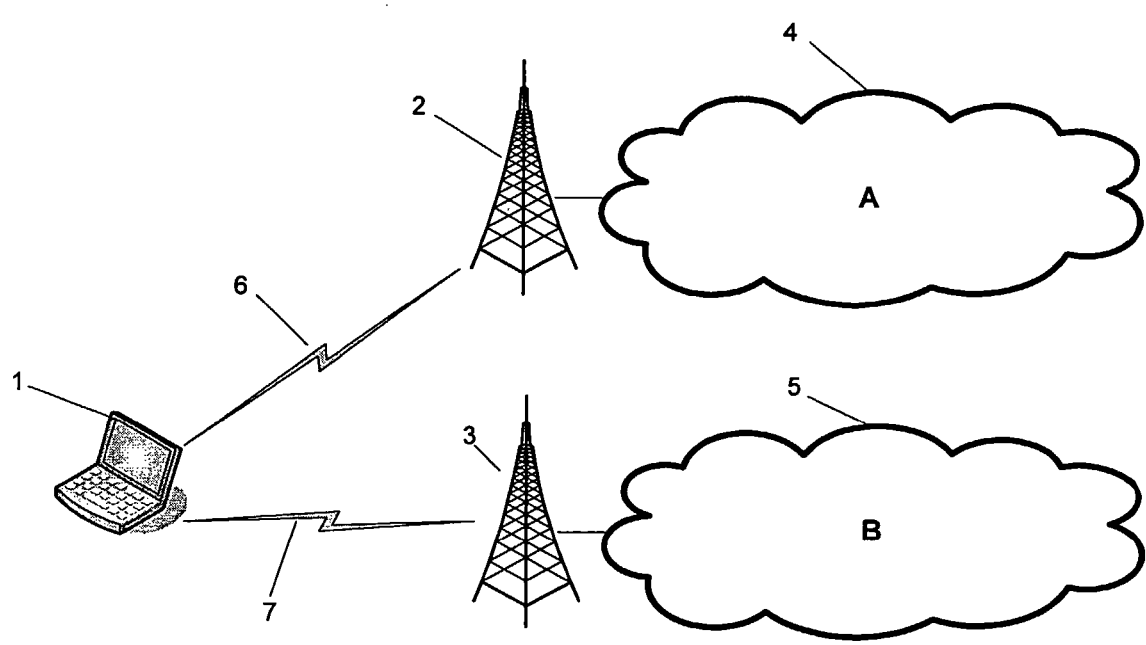
FIG. 1 is a schematic illustration of a network according to the present invention.

FIG. 1 illustrates a network topology wherein the present invention may find application. A mobile station 1 desires to connect to a network 4 or 5 via one connection point 2 or 3 using a wireless interface 6 or 7. In order to establish the best connection, the mobile station 1 may use a number of different parameters in a decision process for deciding which connection to use. Therefore it is of interest to obtain adequate information about the connection points, for instance information relating to the decision about which connection point to use.

Connection points may be for instance an access point in a wireless local area network (WLAN), a master in Bluetooth network, a base station in a mobile phone network, or a gateway in other wireless based communication networks. Below, an example of the present invention in a WLAN network will be given.

In the solution according to the present invention, a beacon signal is first extended with a flag which indicates that the access point 2 or 3 is capable of delivering extra information before standard WLAN (Wireless Local Area Network) attachment frames are interchanged. If the mobile station supports using this extra information, it may send a special information request frame to the access point. The access point can then send the requested extra information in one or more special information reply frames. These information reply frames may contain any information that can help the mobile station to select the access point. The actual attachment process with the access point follows the normal WLAN procedure.

The access point constructs the beacon according to standard format; however, it also inserts a new TLV-encoded (Type Length Value) tagged parameter into a tagged parameters list part of the beacon signal. This tagged parameter is, for example 2 bytes long, comprising a tag number (1 byte long) and a tag length (1 byte long).

Figure 2:
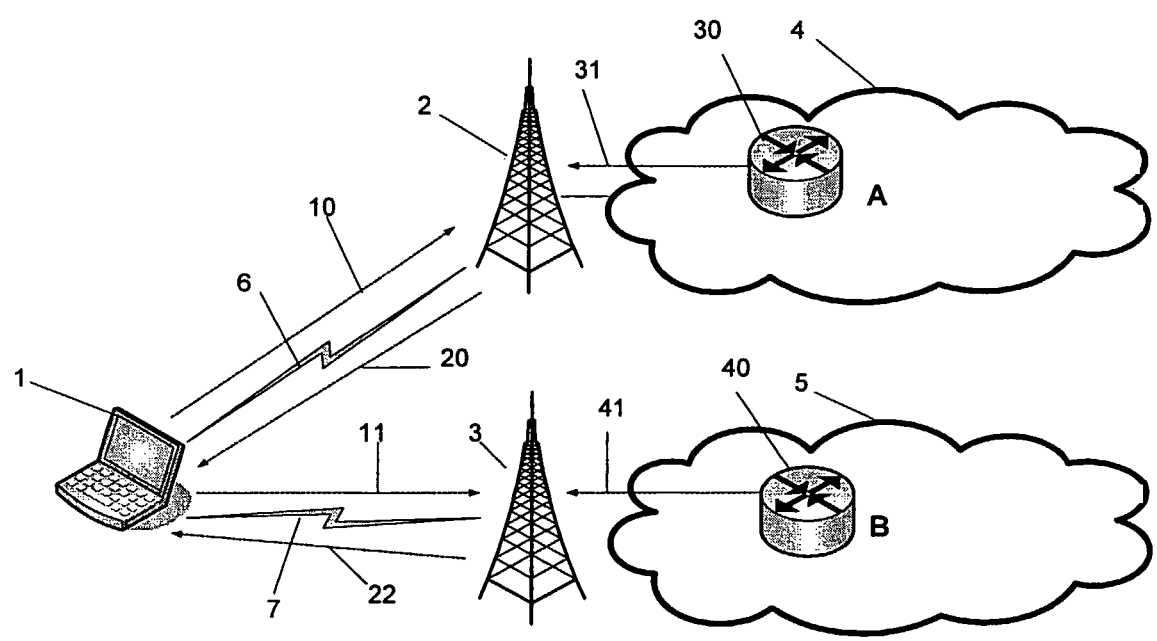
FIG. 2 is a schematic illustration of communication messages in the network from FIG. 1.

Referring to FIG. 2, when the mobile station 1 receives a beacon, it examines whether it contains this tagged parameter. If the mobile station 1 doesn't recognize the new tagged parameter or the received beacon doesn't contain it, the WLAN access selection and attachment process continues according to standard procedures, for instance according to standard specifications according to IEEE 802.11 family protocol (i.e. all IEEE 802.11 protocol members, e.g. 802.11a, b, g, n and so on). Other standard protocols may be IEEE 802.15 and IEEE 802.16 families.

If the tagged parameter is detected, the mobile station 1 can send an information request frame 10 or 11 to the access point 2 or 3. Upon receiving the information request frame the access point 2 or 3 can reply with the information reply frame 20 or 22. It should be noted that this frame is sent only to the requesting mobile station 1 (i.e. unicasted) unlike the beacon, which is sent to all mobile stations on the channel (i.e. broadcasted) within the range of the access point.

The information sent in the information reply frames 20 or 22 may be collected from any number of information sources. This information may optionally be cached by the access point until it is expired.

An example, illustrated in FIG. 2, of such an information source is a IPv6 (Internet Protocol version 6) neighbour discovery message, namely Router Advertisement messages (RA) 31 or 41, which are sent by routers 30 or 40 connected to the same network 4 or 5 as the access point 2 or 3. The access point may cache the contents of these RA messages 31 or 41 so that it can reply immediately. The RA message contains e.g. the IPv6 network prefixes, but it may also contain additional information (such as price), as RA options. New RA options can easily be defined without affecting the interoperability of the existing IPv6 implementations.

It should be noted, however, that the invention is not IPv6-specific. Information sent in the information reply messages may contain any type of information, such as access point ownership, network load status, cryptographic network identities, roaming related information, available services, routing information, geographical location information, and commercial information. Access point ownership may be of importance for billing purposes, the user may want to connect to a "home" based access point as a first choice in order to receive as low costs as possible for the connection; with "home" based is meant either the users own access point located at home or in an office part of a company or institution to which the user has relation to, or it may mean a commercial network operator to which the user has business relation to, such as for instance a hot spot network of access points installed at various places to which the user may roam to due belonging to the operator owning the hot spot network. Network load status may be important in order to receive as reliable and high quality connection as possible, which may be important for a VoIP (Voice over Internet Protocol) connection. The user may be interested in specific available services within a network and may desire to primarily connect to networks with these specific services available. Commercial information may for instance be advertisements for available shops or business operations within a certain area.

The invention makes it possible to acquire network characteristic information as part of the existing process which takes place automatically when a WLAN mobile station is discovering the access points. The solution can be implemented in a way that it will be compatible with legacy nodes and rest of the network. A legacy node is a node which does not implement the teachings of the present invention.

In addition, the information can be obtained without the need to apply network settings of the network being connected to. In this way the user doesn't have to go through possible authentication and configuration processes in order to obtain the information that may affect the way the user uses the network.

Figure 3:
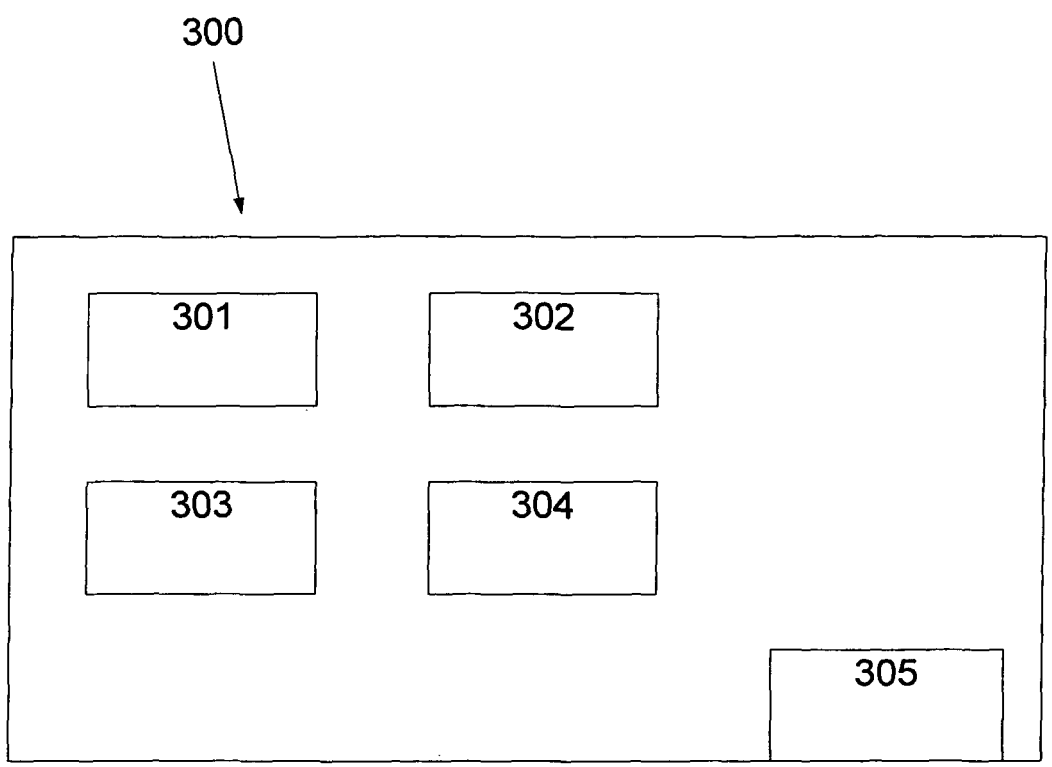
FIG. 3 is a block diagram of a device according to the present invention.

FIG. 3 illustrates a mobile station 300 according to the present invention, comprising a computational unit 301, storage unit 302, and communication unit 305. It may also comprise further functionality in the form of further storage units 303 and user interface units 304. However, the list of functionality and units is not complete since the invention may be utilized in a number of different devices communicating according to the present invention. This may be appreciated by the person skilled in the art. Other forms of devices where the present invention may find applicability are: in mobile phones, in stand alone measurement devices, personal digital assistants (PDA), and MP3 players or similar music or video storage units adapted for communicating with a network. The access point has a similar structure with a processing unit controlling the essential features of the access point and in connection with other functional units in the access point, e.g.; storage unit(s), at least one communication unit for communicating with mobile stations 1, and at least one communication unit for communicating with an external network (e.g. Internet) 4, 5.

The computational unit may be any type of suitable computational unit, including, but not limited to, a microprocessor, an FPGA (field programmable gate array), an ASIC (application specific integrated circuit) or similar devices. The storage unit may be any volatile or non-volatile memory type, e.g. RAM (random access memory), ROM (read only memory), hard disk, flash disks and so on as understood by the person skilled in the art.

Communication from the access point to the external network 4, 5 may be of either wired or wireless type, e.g. Ethernet, ATM (Asynchronous Transfer Mode), LMDS (Local Multipoint Distribution System), DSL (Digital Subscription Line), PTSN (Public Switched Telephone Network), WLAN, GPRS (General Packet Radio System), UMTS (Universal Mobile Telephony System), or backbone systems for mobile telephony systems.

The present invention may be realized as instruction sets in a software code run in the computational unit 301 and for instance stored in the storage unit 302.

Figure 4:
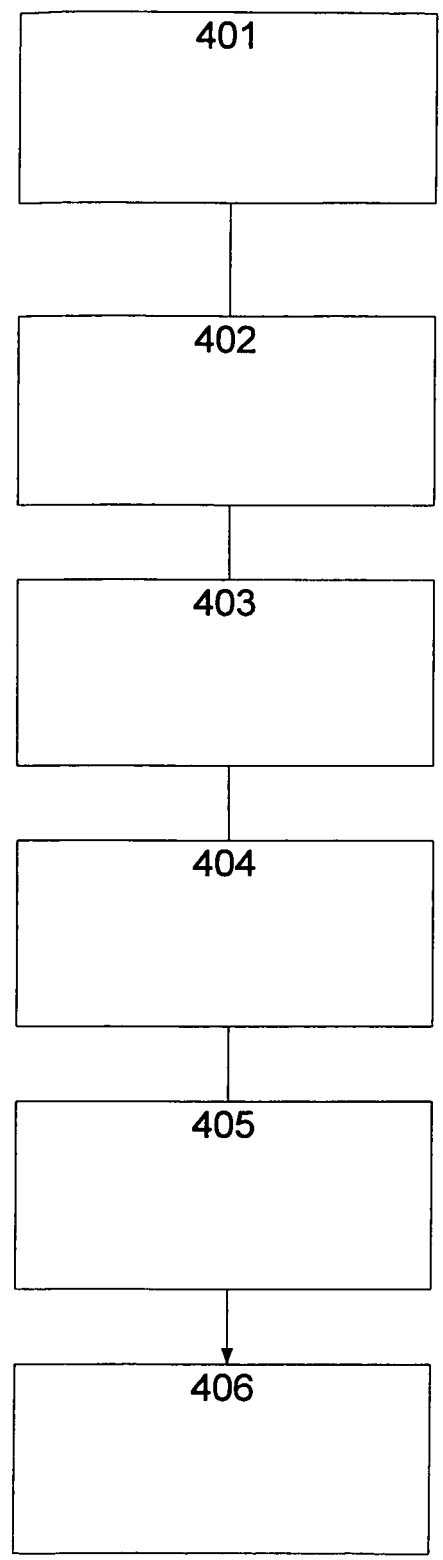
FIG. 4 is a block diagram of a method according to the present invention.

Turning now to FIG. 4, a method of interchanging communication will be discussed. An access point transmits a beacon including a flag indicating that additional information is available (401). A mobile station receives this beacon and interprets the flag correctly (402). The mobile station then sends a request to the access point, asking the access point to transmit the additional information (403). The access point receiving the request sends a response to the mobile station with the requested information (404). Steps 401 to 404 may not be repeated for all access points within the communication range of the mobile station. When a suitable access point is found, the station can then proceed to step (406) without repeating the steps for remaining access points. This is due to the fact that there are two options, whether to collect all information before doing the selection (as described in the current application) or to do selection after each response, e.g. the station may search for an access point with certain characteristics.

If all access points are searched and when all access points have sent their respective information, the mobile station decides on which access point to connect to (405) and then initiates normal-connection procedures (406).

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method of communicating information to a mobile station which could connect to a Wireless Local Area Network (WLAN) via an access point, the method implemented by the mobile station comprising steps of:

receiving a beacon signal at the mobile station prior to when the mobile station establishes a connection to the WLAN via the access point, wherein the beacon signal is broadcasted from the access point of the WLAN to listening mobile stations within communication range, the beacon signal has an information tag alerting mobile stations that additional information relevant to a connection decision is available;

interpreting, at said mobile station, the information tag;

sending an information request from said mobile station to said access point;

receiving in said mobile station said additional information sent from said access point;

deciding in said mobile station to connect to the access point which is a component of the WLAN or to another access point which is a component of another WLAN based on said additional information, wherein an actual attachment process with the selected access point follows normal WLAN procedure; and wherein the beacon signal comprises a type-length-value (TLV) tagged parameter list comprising at least information about an identity of said access point, and the information tag alerting of additional information available at said access point, wherein said tag comprise two bytes of information; a tag number and a tag length.

2. The method according to claim 1, wherein said additional information is at least one of access point ownership, network load status, cryptographic network identities, roaming related information, available services, routing information, geographical location information, and commercial information.

3. The method according to claim 1, wherein said additional information is cached in said access point.

4. The method according to claim 1, wherein said additional information is collected from network nodes connected to said access point.

5. The method according to claim 1, wherein said signal is a beacon message prepared in said access point.

6. An access point which is a component in a Wireless Local Area Network (WLAN), comprising:

a wireless communication interface for communicating with mobile stations;

a communication interface for communicating with a network, wherein said access point is arranged to prepare a signal with an information tag alerting said mobile stations that additional information relevant to a connection decision with the WLAN is available, wherein the signal is broadcast prior to when the mobile stations establish a connection to the WLAN via the access point; and wherein the signal comprises a type-length-value (TLV) tagged parameter list comprising at least information about an identity of said access point, and the information tag alerting of additional information available at the access point, wherein said tag comprise two bytes of information; a tag number and a tag length.

7. The access point according to claim 6, wherein said additional information is at least one of access point ownership, network load status, cryptographic network identities, roaming related information, available services, routing information, geographical location information, and commercial information.

8. A mobile station which could connect to a Wireless Local Area Network (WLAN) via an access point, comprising a wireless communication interface for communicating with the access point, wherein said mobile station is arranged to interpret an information tag present in a beacon signal sent from said access point and received prior to when the mobile station establishes a connection to the WLAN via the access point; said information tag alerting of additional information relevant to a connection decision is available in said access point, said mobile station further arranged to send a request for said additional information and further arranged to decide to connect to the access point which is a component of the WLAN or to another access point which is a component of another WLAN based on said additional information, wherein an actual attachment process with the selected access point follows normal WLAN procedure, and wherein the beacon signal comprises a type-length-value (TLV) tagged parameter list comprising at least information about an identity of said access point, and the information tag alerting of additional information available at said access point, wherein said tag comprise two bytes of information; a tag number and a tag length.

9. An instruction set embodied in a non-transitory computer-readable medium in a mobile communication device which could connect to a Wireless Local Area Network (WLAN) via a gateway, the instruction set operable, when executed by a processor, to perform steps comprising:

receiving a beacon including an information tag alerting of additional information relevant to a connection decision is available in a gateway, wherein the beacon is received prior to when the mobile communication device establishes a connection to the WLAN via the gateway;

sending a request for said additional information to said gateway;

receiving said additional information;

deciding to connect to the gateway which is a component of the WLAN or to another gateway which is a component of another WLAN based on said additional information, wherein an actual attachment process with the selected gateway follows normal WLAN procedure; and wherein the beacon comprises a type-length-value (TLV) tagged parameter list comprising at least information about an identity of said gateway, and the information tag alerting of additional information available at said gateway, wherein said tag comprise two bytes of information; a tag number and a tag length.

10. A method of communicating information to a mobile station which desires to connect to a first network via a first connection point or a second network via a second connection point, the method implemented by the mobile station comprising steps of:

receiving a beacon signal at the mobile station prior to when the mobile station establishes a connection to either the first network via the first connection point or the second network via the second connection point, wherein the beacon signal is broadcasted from the first connection point of the first network or the second connection point of the second network to listening mobile stations within communication range, the beacon signal has an information tag alerting mobile stations that additional information relevant to a connection decision is available;

interpreting, at said mobile station, the information tag;

sending an information request from said mobile station to said first connection point or said second connection point which broadcasted the beacon signal;

receiving in said mobile station said additional information sent from said first connection point or said second connection point which broadcasted the beacon signal;

deciding in said mobile station to connect to either the first connection point which is a component of the first network or the second connection point which is a component of the second network based on said additional information; and wherein the beacon signal comprises a type-length-value (TLV) tagged parameter list comprising at least information about an identity of said first connection point or said second connection point whichever one broadcasted the beacon signal, and the information tag alerting of additional information available at said first connection point or said second connection point whichever one broadcasted the beacon signal, wherein said tag comprise two bytes of information; a tag number and a tag length.

11. The method of claim 10, wherein:

the first connection point and the first network are either (1) an access point and a Wireless Local Area Network (WLAN); (2) a master and a Bluetooth network; (3) a base station and a mobile phone network; or (4) a gateway and a wireless based communication network; and the second connection point and the second network are either (1) an access point and a Wireless Local Area Network (WLAN); (2) a master and a Bluetooth network; (3) a base station and a mobile phone network; or (4) a gateway and a wireless based communication network.

12. A mobile station which desires to connect to a first network via a first connection point or a second network via a second connection point, the mobile station comprising:

a communication unit that receives a beacon signal prior to when the mobile station establishes a connection to either the first network via the first connection point or the second network via the second connection point, wherein the beacon signal is broadcasted from the first connection point of the first network or the second connection point of the second network to listening mobile stations within communication range, the beacon signal has an information tag alerting mobile stations that additional information relevant to a connection decision is available;

a computational unit that interprets the information tag;

the communication unit that sends an information request to said first connection point or said second connection point which broadcasted the beacon signal;

the communication unit that receives said additional information sent from said first connection point or said second connection point which broadcasted the beacon signal;

the computational unit that decides to connect to either the first connection point which is a component of the first network or the second connection point which is a component of the second network based on said additional information; and wherein the beacon signal comprises a type-length-value (TLV) tagged parameter list comprising at least information about an identity of said first connection point or said second connection point whichever one broadcasted the beacon signal, and the information tag alerting of additional information available at said first connection point or said second connection point whichever one broadcasted the beacon signal, wherein said tag comprise two bytes of information; a tag number and a tag length.

13. The mobile station of claim 12, wherein:

the first connection point and the first network are either (1) an access point and a Wireless Local Area Network (WLAN); (2) a master and a Bluetooth network; (3) a base station and a mobile phone network; or (4) a gateway and a wireless based communication network; and the second connection point and the second network are either (1) an access point and a Wireless Local Area Network (WLAN); (2) a master and a Bluetooth network; (3) a base station and a mobile phone network; or (4) a gateway and a wireless based communication network.

* * * * *

UNITED STATES PATENT AND TRADEMARK OFFICE
CERTIFICATE OF CORRECTION

| | | |
|---|---|---|
| PATENT NO. | : 8,588,751 B2 | Page 1 of 1 |
| APPLICATION NO. | : 12/093273 | |
| DATED | : November 19, 2013 | |
| INVENTOR(S) | : Rinta-Aho et al. | |

It is certified that error appears in the above-identified patent and that said Letters Patent is hereby corrected as shown below:

In the Specification

In Column 1, Line 15, delete "selection on of which" and insert -- selection on which --, therefor.

Signed and Sealed this
Sixth Day of May, 2014

Michelle K. Lee
*Deputy Director of the United States Patent and Trademark Office*